(12) United States Patent
Guetta et al.

(10) Patent No.: US 8,111,837 B2
(45) Date of Patent: Feb. 7, 2012

(54) DATA-DRIVEN MEDIA MANAGEMENT WITHIN AN ELECTRONIC DEVICE

(75) Inventors: Anthony J. Guetta, Palo Alto, CA (US); Andrew Rostaing, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 964 days.

(21) Appl. No.: 12/106,187

(22) Filed: Apr. 18, 2008

(65) Prior Publication Data

US 2009/0005892 A1   Jan. 1, 2009

Related U.S. Application Data

(63) Continuation-in-part of application No. 11/824,160, filed on Jun. 28, 2007, now Pat. No. 7,861,008, and a continuation-in-part of application No. 11/824,320, filed on Jun. 28, 2007, now Pat. No. 8,041,438.

(51) Int. Cl.
*H04R 27/00* (2006.01)

(52) U.S. Cl. ............... 381/85; 381/77; 381/80; 700/94; 710/113; 710/116

(58) Field of Classification Search .............. 381/77, 381/80–83, 85; 700/94; 710/113, 116
See application file for complete search history.

(56) References Cited

U.S. PATENT DOCUMENTS

| | | | |
|---|---|---|---|
| 6,859,845 B2 | 2/2005 | Mate | |
| 7,561,932 B1 * | 7/2009 | Holmes et al. ................ | 700/94 |
| 7,653,203 B2 * | 1/2010 | Holmi et al. .................. | 381/86 |
| 2002/0164155 A1 | 11/2002 | Mate | |
| 2005/0180578 A1 * | 8/2005 | Cho et al. .................... | 381/56 |
| 2007/0019823 A1 * | 1/2007 | Miyazaki et al. ............. | 381/87 |
| 2007/0207733 A1 | 9/2007 | Wong et al. | |
| 2007/0283423 A1 | 12/2007 | Bradley et al. | |
| 2008/0183575 A1 | 7/2008 | Kaplan et al. | |
| 2008/0186960 A1 | 8/2008 | Kocheisen et al. | |
| 2008/0187967 A1 | 8/2008 | Rostaing et al. | |
| 2008/0244050 A1 | 10/2008 | Wong et al. | |
| 2009/0003620 A1 | 1/2009 | McKillop et al. | |
| 2009/0005891 A1 | 1/2009 | Batson et al. | |
| 2009/0005892 A1 | 1/2009 | Guetta et al. | |
| 2009/0006671 A1 | 1/2009 | Batson et al. | |
| 2009/0034750 A1 | 2/2009 | Ayoub et al. | |
| 2009/0187967 A1 | 7/2009 | Rostaing et al. | |
| 2011/0093620 A1 | 4/2011 | Batson et al. | |

OTHER PUBLICATIONS

U.S. Appl. No. 11/824,320, filed Jun. 28, 2007, Office Action, Mailing Date Mar. 4, 2010.
U.S. Appl. No. 11/824,320, filed Jun. 28, 2007, Notice of Allowance, Mailing Date Aug. 15, 2010.
U.S. Appl. No. 11/824,320, filed Jun. 28, 2007, Restriction Requirement, Mailing Date Sep. 20, 2010.
U.S. Appl. No. 11/824,320, filed Jun. 28, 2007, Notice of Allowance, Mailing Date Jun. 30, 2011.
U.S. Appl. No. 12/980,277, filed Dec. 28, 2010, Office Action, Mailing Date Sep. 7, 2011.

* cited by examiner

*Primary Examiner* — Devona Faulk
*Assistant Examiner* — Disler Paul
(74) *Attorney, Agent, or Firm* — Hickman Palermo Truong & Becker LLP

(57) ABSTRACT

A method and apparatus for intelligently routing and managing audio signals within an electronic device is disclosed. The routing is responsive to a set of logical and physical policies which are stored in data tables which can be updated as needed.

45 Claims, 9 Drawing Sheets

| | present? | ring tone | keypad | music |
|---|---|---|---|---|
| main speaker 104 | yes | yes | no | yes |
| headphones 112 | yes* | yes (conditional) | no | yes |
| UI speaker 124 | yes | not permitted | yes | not permitted |
| wireless 116 | no** | ----- | ----- | ---- |
| line-in line-out 120 | no | ----- | ---- | ---- |

210
(enabled devices and policies)

| | present? | ring tone | keypad | music |
|---|---|---|---|---|
| main speaker 104 | yes | yes | no | yes |
| headphones 112 | yes* | yes (conditional) | no | yes |
| UI speaker 124 | yes | not permitted | yes | not permitted |
| wireless 116 | no** | ---- | ---- | ---- |
| line-in line-out 120 | no | ---- | ---- | ---- |

210₁ (enabled devices and policies)

FIG. 3A

|  ring tone ↓ | keypad ↓ | music ↓ |
|---|---|---|
| main speaker 104 | UI speaker 124 | headphones 112 |
| headphones 112 | | main speaker 104 |
| | | wireless 116 |

210₂ priority table (ranked)

FIG. 3B

DATA-DRIVEN MEDIA MANAGEMENT WITHIN AN ELECTRONIC DEVICE

PRIORITY CLAIMS

This application is a Continuation-In-Part of U.S. patent application Ser. Nos. 11/824,160 now U.S. Pat. No. 7,861,008 and 11/824,320 now U.S. Pat. No. 8,041,438, both filed on Jun. 28, 2007, both of which are incorporated herein by this reference in their entirety.

FIELD OF THE INVENTION

The present invention relates to routing audio within an electronic device using a variety of sources and outputs.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices can often handle playback of multiple types of media. The media that may be played back by computing devices often includes numerous forms/formats of video, and numerous forms/formats of audio. Within such computing devices, many applications may be competing to play back media. Examples of types of applications that may attempt to play back media within a handheld computing device include, for example, a telephone application, a web browser, an e-mail application, short message service (SMS), a music player, video player, instant messaging (IM), multimedia message service (MMS), voice over IP (VOIP), and teleconferencing.

Within computing devices, the various software applications that play back the media can all contend for use of the various audio resources, and have different rules and protocols for doing so. Some of these rules and protocols may conflict from one application to another.

To complicate things further, many computing devices also have multiple possible outputs for playback of the media. For example, a handheld computing device may have a line-out port, a headphone port, a docking port, and multiple speakers, each of which may serve a different function and have different capabilities.

One way to handle the contention among the applications for the playback resources of a computing device is to design each application with logic to check the state of settings of the device, and decide for itself where, when and how to play its media. Unfortunately, using this approach, each software application developer has to implement code for a behavior tree that attempts to take into account the variety of factors that can impact media playback on a device. The result may be less-than-optimal media handling decisions made by more-complex-than-necessary applications.

To further complicate the routing and playback operations, it may be desirable to have audio processed in specific ways under specific circumstances. For example, when music and voice audio are to be played concurrently, it may be desirable to mix the music and voice audio in a particular way. Typically, such custom treatment of specific cases would have to be hard-coded into the logic of the software and/or hardware components involved in the playback. Hard-coding such customizations significantly increases the complexity of a devices software and/or hardware components.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B are example data tables according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for handling media playback requests from multiple applications on a device. Rather than relying on the individual applications to make the right decisions about how their media playback needs should be handled, a centralized mechanism is provided for servicing the playback requests from the multiple applications. The centralized mechanism decides how to handle requests based on a variety of factors. Examples of the factors include what other activities are occurring within the device, an audio category, settings on the device, preferences, and what external devices are currently connected to the device. In one embodiment, the rules that govern how the centralized mechanism makes the decision based on such factors are embodied in data stored in repository accessible to the centralized mechanism, rather than hard-coded in the software components of the mechanism.

Overview of Example Handheld Device

The techniques described herein for handling the playback of media within a device may be applied to any type of electronic device for which multiple applications compete for limited playback resources. Handheld electronic devices, such as personal digital assistants and mobile phones, are merely examples of devices to which the techniques may be applied. However, for the purpose of explanation, examples of the techniques shall be given with reference to handheld devices.

Figure 1:
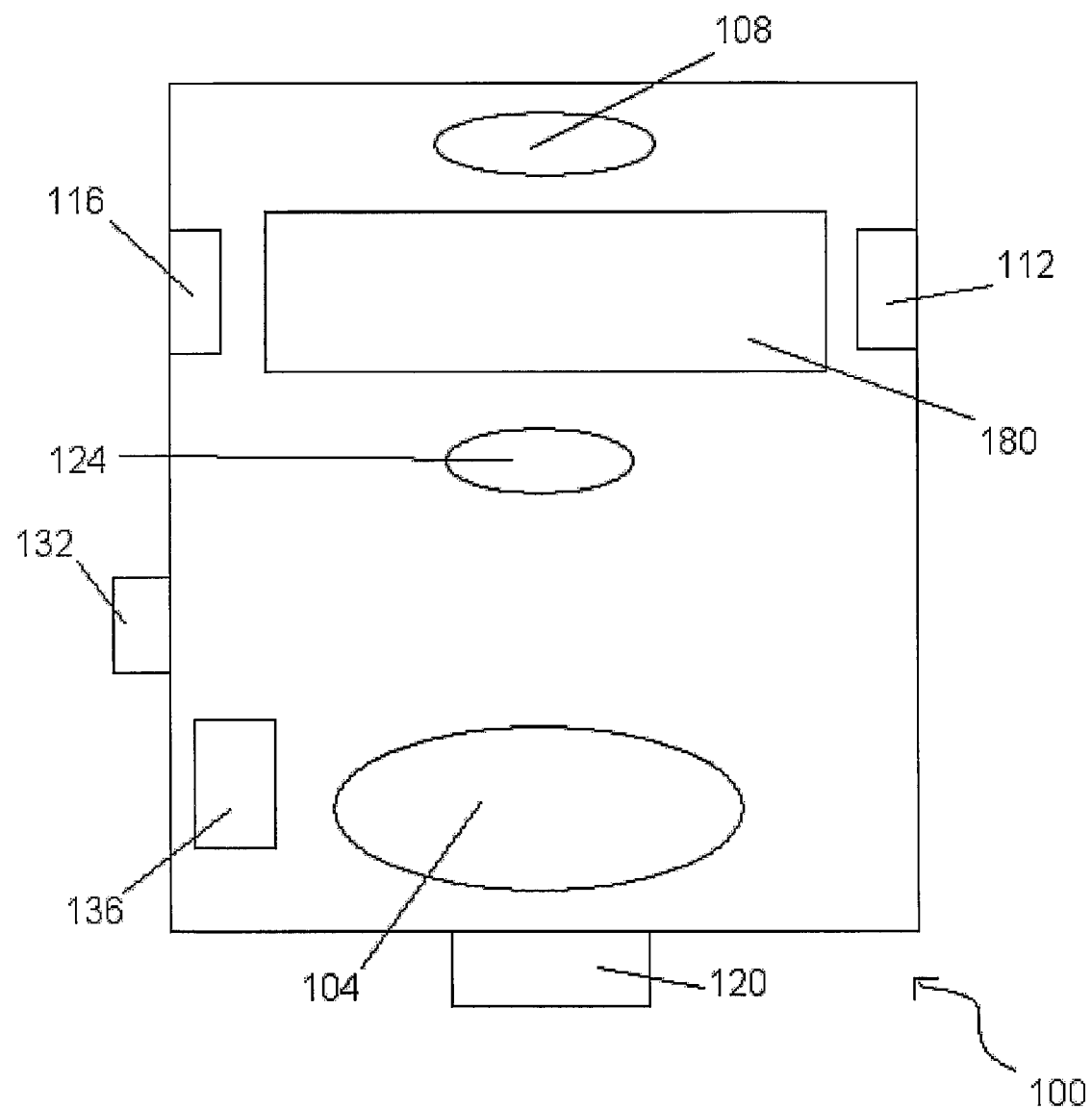
FIG. 1 is a block diagram of a handheld device upon which embodiments of the present invention can be located.

FIG. 1 shows an example handheld device 100 upon which an embodiment of the present invention could be located. It is to be noted that FIG. 1 is but an example, so that devices other than that shown in FIG. 1 are also contemplated within the spirit and scope of the present invention. As shown in FIG. 1, the device 100 comprises at least a display 180 (which may or may not be touch-sensitive), a main speaker 104, a telephone receiver/speaker 108, a jack 112 for either headphones (listen only) or headset (listen and talk), a wireless transmitter/receiver 116 such as but not limited to Bluetooth®, a line out port 120 (suitable for a docking station used by e.g. larger home-audio system), and also a user interface (UI) speaker 124 (e.g. for keypad click-tones). Other types of speakers and audio ports may also be included. As stated, the device 100 is but one possible embodiment, so that the techniques described herein are not limited exclusively thereto.

The telephone receiver/speaker 108 may be similar to a receiver used within a conventional telephone. The touch-sensitive version of the display 180 may contain a keypad which in turn can generate sounds when touched.

The device 100 further comprises a mute switch 132, and a vibration means 136. A mechanism for enabling/disabling the vibration means 136 is available through the display 180 by accessing a software application loaded on the device 100.

Software applications that may be resident on the device 100 include but are not limited to e-mail, telephone, voice-mail, web-browser, short messaging service (SMS), entertainment player either for music or video, camera, and slide-show (with music accompaniment).

The UI speaker 124 is intended mainly for playing keypad sounds (clicks) and notifying the user that certain steps and key-actions may be illogical or not permissible (beeps). However, under certain circumstances this policy can be overridden.

Configuration of Overall System

Figure 2:
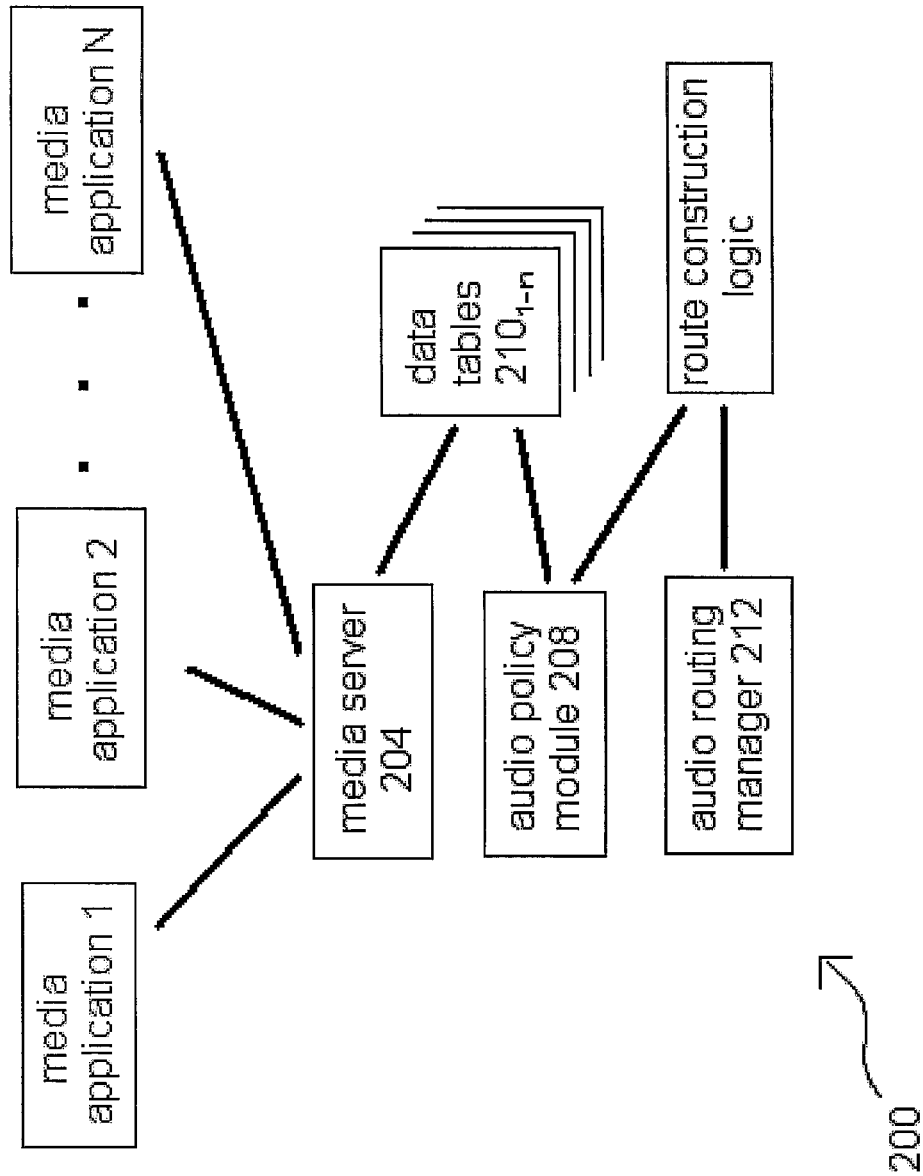
FIG. 2 is a functional overview of an embodiment of the present invention.

FIG. 2 shows an example system 200 for managing audio routing within an electronic device, according to one embodiment of the present invention. FIG. 2 is but one example of a possible system, and other types of arrangements could also be achieved within the spirit and scope of the present invention. Within the system 200, a media server 204 acts as an interface and coordinator with the various software applications that may need to use audio resources within the device 100.

The media server 204 achieves this partly by communicating with an audio policy manager 208 in order to determine what resources are available, and what policies exist for playing audio. The audio policy manager stores various policies and other resources in tables $210_{1-n}$. The audio routing manager 212 is responsible for determining a suitable route for the requested audio.

The system 200 also tracks what has happened in recent user history. Not just the most recent user choice ("last in"), but also second to last in, third to last in, and potentially further back.

Audio Categories

The software applications request use of audio resources within the device 100 by specifying categories of audio to the media server 204. These categories are established for media based on the intent of the media (which is different from the format and/or source of the media). Examples of potential audio categories within the system 200 include but are not limited to music, video soundtrack, voice telephone call, telephone voice mail, e-mail notification, short message service (SMS) notification, user interface sounds, ring tones, and alerts. UI sounds comprise separate sub-categories of audio, including but not limited to clicks and beeps.

Within various other devices, each software application was implementing its own decision tree by itself, somewhat inconsistently. There were also problems that the software applications were not consistent, and the user would be confused. Conversely, within the system 200, a sound category is forwarded from a software application and then managed by the media server 204.

Audio Policies

General factors used to determine how to route audio can include audio category; status of physical switch 132; available hardware (e.g. headphones, wireless), and current state of the device 100 including what media is or is not currently playing for the user. Additional factors may include the identity of the software application that has an intent to route the audio. This and other information assists in forming the audio policies that are used by the system 200.

The user interface within the device 100 seeks to avoid introducing too many choices to the user. It is also desired that the policies make sense, so that the user is never surprised, or left with the question "why did that happen?" Accordingly, a set of default policies exist per audio category. One such default is that user-initiated sounds (such as the UI keyclick sound) are muted when the mute switch 132 is enabled. Even though these sounds are expected by the user, and are not very obtrusive, if the mute switch 132 is enabled, the key clicks are not heard. This policy, like many others, is not absolute but is a default.

There are policies that also prohibit certain types of audio routing, although these policies can be over-ridden. For example, one policy is that music is unlikely to be played to the UI speaker 124. Yet another (waiveable) policy might be to not play music through the wireless speaker 116, although in certain cases music could be mixed in. These policies are not fixed and immutable, but instead part of the flexibility of matching a user interface with the hardware capabilities of a device.

However, if a telephone call is in progress (again, the system 200 always looks at what's currently occurring within the device 100), then it is reasonable to assume that only one audio route exists. This is because the user may be focused on the telephone call, and potentially unable to hear any of the other audio speakers regardless of whether those speakers are available or not. Accordingly, if an e-mail notification comes in, it may be desirable to have a policy to mix in the e-mail notification into the telephone audio. Further, if a notification is deemed to be sufficiently important (by policy), that notification could be broadcast across all speakers.

Media Server Module

The media server 204 is a centralized mechanism for handling audio associated with the various media-playing software applications. Accordingly, the various software applications do not need to have their own logic and resources for deciding how to manage audio. Instead, these software applications merely forward an intent to play a certain type of audio to the media server 204. As part of forwarding that intent, the software applications disclose a specific audio category to the media server 204. The software applications then depend on the media server 204 to manage the various contentions, and ensure the appropriate audio gets properly routed. Where possible, the media server 204 will honor the intent forwarded by the application, but in some cases may be forced to refuse.

The types of decisions expected of the media server 204 include but are not limited to determining: whether to play media at all, where to play it, a volume level, what specific audio media to play, whether to vibrate, whether to click, whether to blink the display 180, as well as other tasks. The media server 204 evaluates the intents forwarded by the various software applications partly by classifying the various audio requirements into audio categories.

The media server 204 centralizes and ensures consistent audio decisions that do not surprise the user. The media server 204 discerns the intent of the audio category, and then communicates the requested category to the audio routing policy module 208, which references the various data driven tables $210_{1-n}$. Whenever the user adds or removes a piece of hardware, the data tables $210_{1-n}$ are updated. Accordingly, the audio routing policy module 208 always knows what is connected to the device 100. The audio routing manager 212 then tells the device 100 how to play out the audio.

Audio Policy Module

The audio policy module 208 enforces policies for each of the numerous audio categories. The audio policy module 208 can use metadata-based representations of these policies within the tables $210_{1-n}$, as opposed to the policies being coded into executable logic. However, the tables $210_{1-n}$ can be code driven also.

As shown in FIG. 2, alongside both the media server 204 and the audio routing policy module 208, several data tables $210_{1-n}$ are used, thereby forming a multi-dimensional decision matrix. As the user changes their mind and preferences, the system 200 updates various of these data tables $210_{1-n}$, while others may remain unchanged. One example of this is that the system 200 is sufficiently intelligent to distinguish headphones and headsets connected to the port 112, and to update various of the tables $210_{1-n}$ accordingly.

The policies stored in the tables $210_{1-n}$ are not rigidly enforced, but instead serve as a guide to the media server 204 and the audio policy module 208. There can be user-initiated overrides of the policies. One example is if a user plugs in headphones 112 after a wireless connection 116 has been enabled. At such a point, it would be reasonable to assume that the user wants to hear audio through the headphones 112, and not the wireless 116. This is known as "last in wins" policy. This policy exists because it is reasonable to assume that the last thing the user did to interact with the device must be what the user wants.

However, there are exceptions to the "last in wins" policy. In carrying out its responsibilities, the audio policy module 208 will review various of the data tables $210_{1-n}$. If next audio item in a specific data table $210_n$ supports wireless, but the category is anti-wireless, that is, not suitable for playing over wireless (e.g. UI sounds), then the audio policy module 208 will go step down in the queue of the tables $210_{1-n}$. The next item in the queue might be the UI speaker 124. Thus is a simple example where the "last-in wins" policy is conditional, and is not always obeyed.

Another example of this might be with regard to user overrides. For example, a software button on the display 180, might allow a user to divert a telephone call to the main speaker 104. This clear and unmistakable user choice would override other policies, including even the "last in wins" policy which normally has significant deference.

Suppose the mute switch 132 is enabled. One policy might be that user-initiated sounds e.g. typing keypad sounds may still sound, that is, be non-muted, but that non-user-initiated sounds (e.g. e-mail notifications or SMS notifications) do not sound. Setting aside the mute switch 132, another policy might be that user-initiated clicks such as typing sounds and other beeps are generally not routed to the main speaker 104.

According to one embodiment, within the system 200, there are certain policies that are unaffected by the user actions. Other tables, however, change depending on user-derived actions. When a user adds or removes something, various of the data tables $210_{1-n}$ change. Another policy is that the wireless 116 and telephone receiver 108 are unlikely choices when the audio category is music, and thus should appear as extremely low priority within the tables $210_{1-n}$, if at all.

A single policy can give rise to several choices. One example of this is if incoming e-mail notification occurs, one of the data tables 210 may hold the information "user prefers to be apprised of incoming e-mail notification". However, the specific notification means might be located in a different data table. The audio policy module 208 must then view the various data tables $210_{1-n}$ and decide: generate the notification audio, vibrate, do both, or do neither.

The data tables $210_{1-n}$ also contain information about the properties of routes, connections that belong to routes, and nodes that belong to connections. The values of such properties may affect a variety of things, including whether routes are selected, whether specific connections within routes are optional, and how audio is processed at specific ports when specific connections are used to route the audio. The properties describe how the nodes, connections, and routes should be configured.

The audio policy module 208 stores the order in which pluggable items have come online within various of the tables $210_{1-n}$. The audio policy module 208 also stores within the data tables $210_{1-n}$ a map of per audio-category information including whether that audio category is broadcast, whether that category obeys or ignores the ringer/mute switch 132, and a prioritized list of routes, such as those shown in FIG. 6. The audio policy module 208 further stores a list of outputs (both pluggable and non) which should be ignored if the ringer/mute switch 132 is enabled.

In normal use of the device 100, events happen which cause the system 200 to change audio categories. Examples of such an event might be a song ending, or a user clicking a key on the display 180. At this time, the media server 204 instructs the audio policy module 208 to change categories. The audio policy module 208 then reviews the top of the ordered list of pluggable outputs described earlier.

Figure 7:
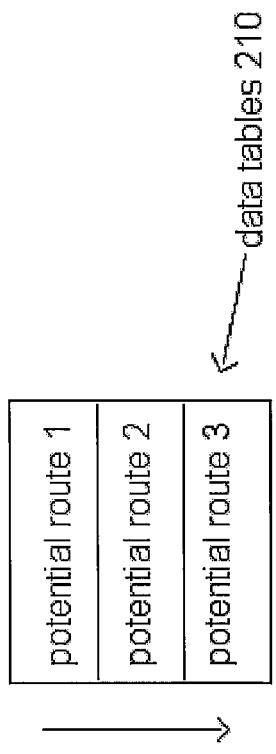
FIG. 7 shows an example of cycling through data tables according to an embodiment of the invention.
Figure 7:
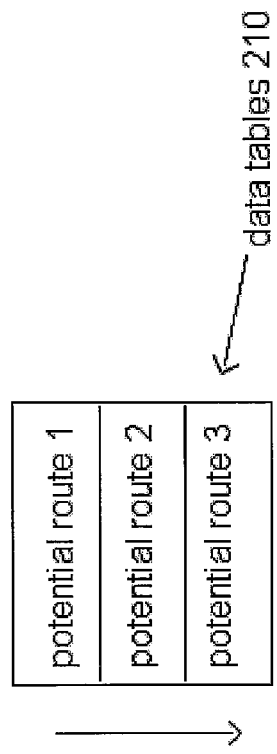

At this time, the audio policy module 208 also reviews the audio category in the stored map within the data tables $210_{1-n}$, and determines whether the pluggable output is stored in the prioritized list of routes within the data tables $210_{1-n}$, such as those shown in FIG. 7. If the pluggable output is stored therein, the audio policy module 208 selects the appropriate route description, and requests that the audio routing manager 212 commit the routes.

If the output is not stored therein, the audio policy module 208 reads the remaining items in the map of per audio-category information, and compares those items with the prioritized list of routes. If the output is present, the audio policy module 208 selects the appropriate route description, and requests that the audio routing manager 212 commit the routes.

Whenever a new pluggable output becomes available, the audio policy module 208 follows a different path. The audio policy module 208 pushes the pluggable item to the top of the ordered list of outputs stored within the data tables $210_{1-n}$, and then looks up the currently applied category in the audio category map. The audio policy module 208 then determines whether the output exists in the prioritized list of route descriptions.

Figure 5:
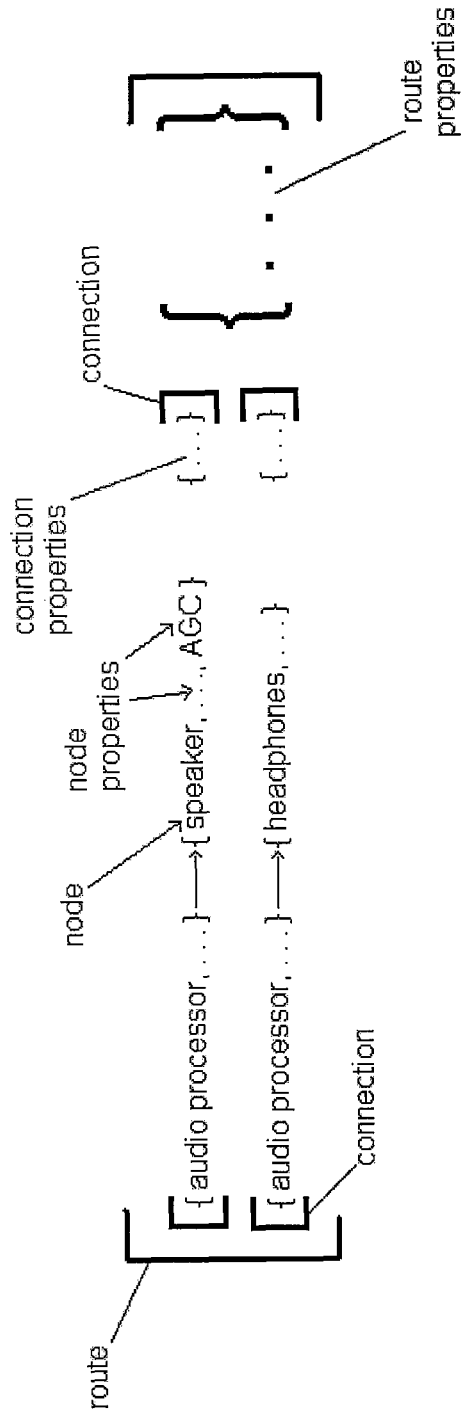
FIG. 5 shows examples of nodes, connections, routes, and properties, according to an embodiment of the invention.
Figure 5:
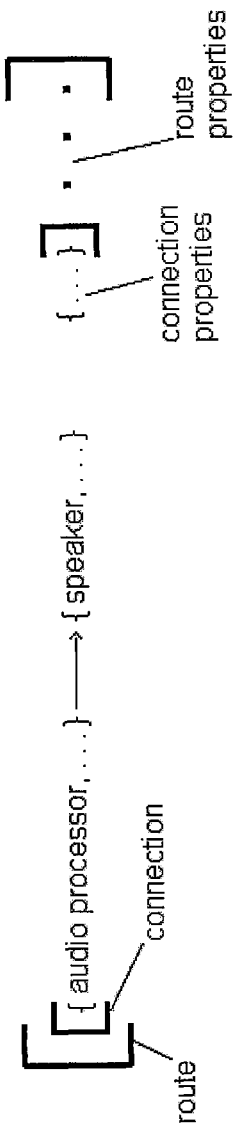
Figure 6:
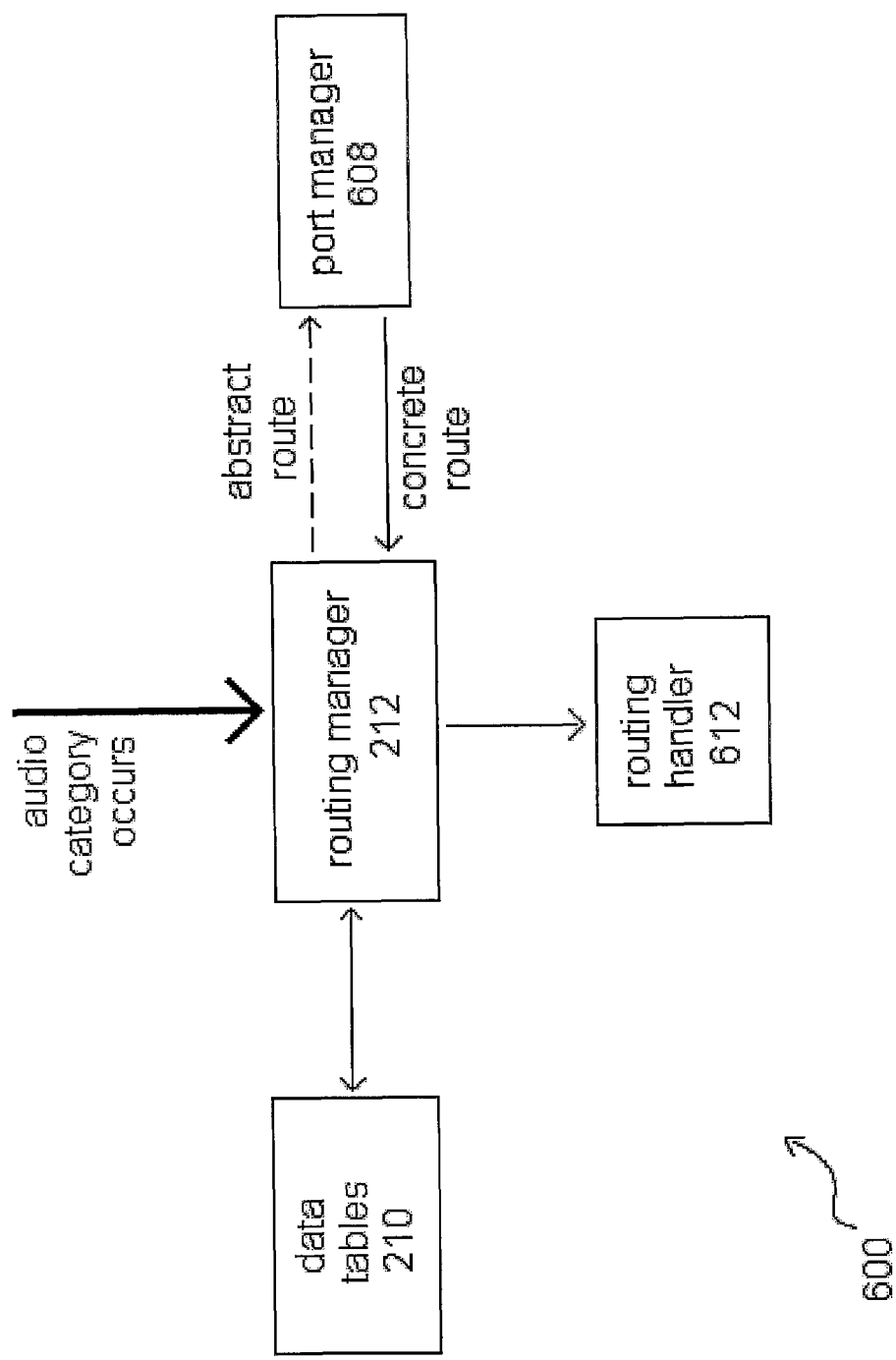
FIG. 6 is a block diagram of an example audio hardware arrangement according to an embodiment of the invention.

If the new output exists within the existing route descriptions, the module 208 outputs policy findings to the audio routing manager 212, and requests that the audio routing manager 212 commit the routes. Details about how the audio routing manager 212 carries out these requests are shown in FIGS. 5-7 and their accompanying description.

Using a different example, suppose the user wants to listen to music. The audio policy module 208 will look at what outputs are connected, as well as the device priorities associated with music playback. The audio policy module 208 may note that e.g. both headphones as well as the main speaker are connected and available for playback. The audio policy module 208 will then check down a data table holding priority information associated with the music category. The first priority may be the line out port 120, but that feature is not currently connected.

The audio policy module 208 will then proceed down the priority list. The next item may be the headphones 112, while main speaker 104 may be the third item in the priority list. The audio routing policy module 208 will then choose headphones for the user, and mute the main speaker 104. However, the present invention should not be considered as limited exclusively to this suggested choice, which is for exemplary purposes only. There may be instances in which it is desired to enable the main speaker 104 simultaneously with the headphones 112.

To further illustrate this, an example data table $210_1$ holding some abbreviated policy information is shown in FIG. 3A. An actual data table 210 could differ significantly from that shown in FIG. 3A, so that the present invention should not be considered as limited exclusively thereto. For purposes of brevity, only five of the audio outlets within the device 100 are shown although numerous others exist. Similarly, only three types of audio categories are shown although again numerous others exist.

In maintaining the table $210_1$, the status of the various audio outlets is continually polled and updated by the system 200. Consequently, the first column is "present?", meaning is the specific audio outlet present, enabled, and available for use. In the example shown, the main speaker 104, headphones 112, and UI speaker 124 are present, and the asterisk at the headphones 112 means that the headphones 112 were "last in". Meanwhile, the wireless 116 and line out 120 outputs are not present, and thus not available for use. However, the wireless 116 is shown with two asterisks, symbolizing it was "second to last in". As stated, the various tables $210_{1-n}$ work together to store data about user history.

The next three columns show three types of audio categories, and whether those categories can be played on the five outlets, according to policy of the system 200. For clarity, priority information and property information is intentionally not shown in the data table $210_1$, nor is but instead only policy. An example priority sequence is instead shown in the data table $210_2$. However, these storage mechanisms are but for exemplary purposes only, so that the present invention should not be considered as limited exclusively thereto.

Starting with keypad audio, it has already been stated that keypad noises are generally only to be played over the UI speaker 124, and not through the main speaker 104 or headphones 112. Exceptions can exist, but this is the general policy. Because the wireless 116 and line out 120 are not enabled, no data is readable, so that no policy is indicated.

Meanwhile, ring tones can be played through the main speaker 104, and potentially through the headphones 112, but only under certain policy conditions. To determine what those policy conditions are, it might be necessary to view data from one of the other tables $210_{2-n}$. Finally, ring tones should not be played through the UI speaker 124 as general policy.

The last category of FIG. 3A is music, which can be played on the main speaker 104 or the headphones 112, but as general policy is not playable on the UI speaker 124.

As stated, FIG. 3B shows an example priority data table $210_2$. For consistency, FIG. 3B has the same example audio categories as FIG. 3A, with various audio outlets ranked in order of priority should one of these audio categories occur. Again, like with FIG. 3A, FIG. 3B is abbreviated, truncated, and simplified for purposes of brevity, so that the present invention should not be considered as limited exclusively thereto. According to the data table $210_2$, if a ring tone occurs, the first priority would be to play it over the main speaker 104. However, if the main speaker 104 is not available, then the system 200 should play the ring tone over the headphones 112.

Similarly, if a keypad noise occurs, the audio associated therewith should be played over the UI speaker 124. The general policy is to not store a second choice for this category.

Continuing the example of FIG. 3B, if music occurs, the first choice should be the headphones 112, but if that is not available the second choice the main speaker 104, and if those are not available the third would be the wireless 116. The presence of the wireless 116 might be stored in the data table $210_2$ despite the fact that the data table $210_1$ shows that the wireless 116 is disconnected. One reason for this presence could be recent usage history, specifically that the user recently used the wireless 116 and thus may use it again.

In both example data tables $210_1$ and $210_2$, it is to be noted that the policies and priorities are not absolute, but instead are suggested. Under certain circumstances both policies and priorities can be overridden.

The system 200 constructs routes by doing a series of appends of small steps to form a complete path. In one embodiment, the routes are formed by using a type of grammar. This grammar can have varying degrees of complexity. A simpler embodiment would have grammar describing source and destination only (direct path). However, there could be problems or conflicts in how the audio arrives at its intended destinations. Thus, the audio policy module 208 may need to intelligently make routing decisions through a variety of audio signal processors, which goes beyond source and destination and also contemplates intermediate points (indirect path). Thus, the routes are constructed for both direct path and indirect path situations. The embodiment of the invention which contemplates intermediate points and indirect paths has the advantage that it removes uncertainty over routing.

Another advantage of routes including intermediate steps is that it can all be held in data tables. Without the intermediate steps, an audio routing manager must infer a route only from endpoints (source and destination). It is preferable to avoid such inferences. This is partly because a device 100 may implement its audio strategy through a variety of signal processing components.

Figure 4:
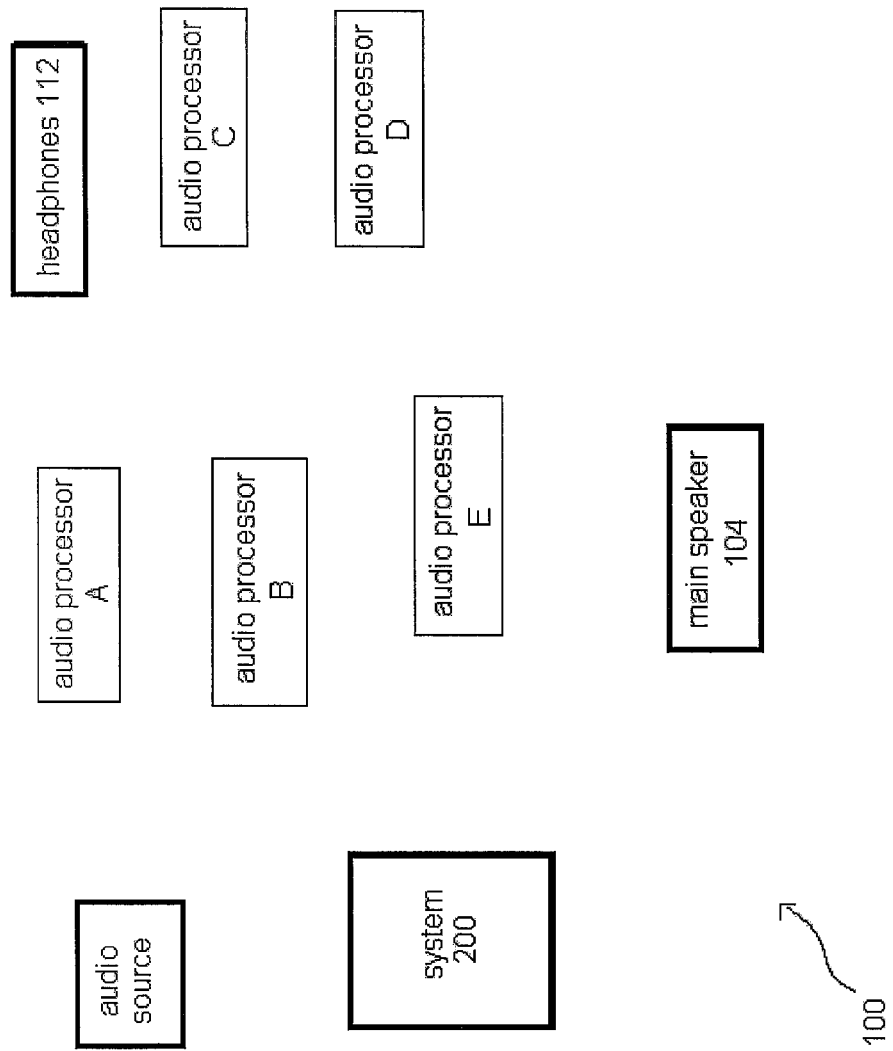
FIG. 4 is a block diagram of an example audio hardware arrangement according to an embodiment of the invention.

An example of how the system 200 achieves routing is shown in FIG. 4, which shows a group of audio processors A, B, C, D, and E. Any or all of these audio processors may have codec capabilities, and may also have baseband features. It is to be noted that FIG. 4 is a block diagram version of only a portion of the audio capabilities of the device 100, and is simplified for the purposes of brevity. In FIG. 4 an audio source is shown. For purposes of example, within FIG. 4 it will be assumed that the system 200 is responsible for deciding how to route audio from the source to either the main speaker 104, the headphones 112, or both. For purposes of example, within FIG. 4 it will be assumed that the system 200 is responsible for deciding how to route audio from the source to either the main speaker 104, the headphones 112, or both.

An example of a route that would be direct path is:
audio source—main speaker 104.

An example of a route that would be indirect path is:
audio source—audio processor A—audio processor D—main speaker 104.

Audio Routing Manager

As shown above, the audio policy module 208 makes policy findings by comparing audio category data to data about currently attached devices, as well as other criteria including policies, and properties of the ports, nodes, connections, and routes. Then, the audio routing manager 212 commits a route based on these policy findings as well as on properties stored in the data tables $210_{1-n}$. The audio routing manager 212 can achieve this by a variety of means.

The audio routing manager 212 is also responsible for removing unwanted pops and other noises, volume-matching, and potentially mixing audio. One way to achieve this is to ramp up when potential problems or aberrational sounds are suspected, thereby preventing unwanted pop sounds due to spikes.

The system 200 also takes precautions with regard to the volume of audio being played. It is important for a volume selection to only affect the appropriate audio, and not affect other audio. For example, it is possible a user wishes to only change the volume of audio stream being routed to the headphones 112, but not change the volume of any audio that may be routed to the main speaker 104. To address this, the system 200 reviews the various tables $210_{1-n}$, and determine which of the audio categories is in use at a given time. At that point, the audio routing manager 212 ensures that the specific category in use is the only one which the volume selector gets linked to.

A user may have set the main speaker 104 to a lower volume, for softer music, but a policy might to make a ring-tone much louder than the music. The audio routing manager 212 is responsible for implementing such a volume difference.

A user may also make a choice of volume levels that is inappropriate. A capping policy can also be implemented, where a maximum volume is imposed under certain circumstances, regardless of a user's selection. The audio routing manager 212 is responsible for implementing this volume limitation.

Another policy is to "duck" a first audio stream, such as music, in order to temporarily increase emphasis on a second audio stream, such as a ring tone. As stated, the "duck" feature is meant to temporary. When the second audio event has finished, the first audio stream is restored to its original volume. The system 200 is responsible for implementing ducking, and information about which audio categories to duck, and under what circumstances, is stored in the data tables $210_{1-n}$.

The audio routing manager 212 interprets the policy findings of the audio policy module 208, to ensure the policy findings make sense. The audio routing manager 212 has the ability to report back to the audio policy module 208 that certain policy findings cannot be implemented. In the case where the policy findings can be implemented, the audio routing manager 212 will then decide how to route the audio through the appropriate audio signal processing hardware, as shown in FIG. 4. For example, audio for the headphones 112 may be processed by different audio processors than audio routed to the main speaker 104.

Another issue is that at any given time during a playback of audio, various and perhaps all of these audio processors A-E can have input on the volume of that audio as heard by the user. A volume adjustment capacity comes within many audio processors. Although only five audio processors are shown in FIG. 4, within any particular device 100 there may be a large number of audio processors. Consequently, knowing every step from source to destination makes it easier for the audio routing manager 212 to manage all volume levels along the route, thereby assuring an appropriate playback experience, with no sudden spikes in volume. All of the elements within FIG. 4 are examples of nodes, but only the audio source, headphones 112, and main speaker 104 are examples of ports.

Additional features of the system 200 can be explained by providing examples. Suppose that a user connects a wireless headset to the device 100. The media server 204, the audio policy manager 208, and the audio routing manager 212 would "find" the wireless device, and connect it to both uplink (source) and downlink (playback) paths. In this example it will be assumed that the user wishes to hear music through the wireless headset, although that may not always be the case.

Now suppose the user receives a telephone call. The audio policy module 208 would first decide how to route the ring tone, and then how to route the telephone audio. After obtaining the policy findings from the audio policy module 208, the audio routing manager 212 would in turn go into action determining how to route first the ring tone and then the telephone audio.

This process is achieved as follows. The audio policy module 208 first checks one of the data tables $210_{1-n}$, and learn that the wireless headset 116 is connected, but that the telephone receiver speaker 108 also is connected. The audio policy module 208 then checks a priority table, and determines that the wireless 116 is a higher priority than the telephone receiver speaker 108. The audio policy module 208 would then forward these logical findings to the audio routing manager 212, which would then select a route for the audio and facilitate that route.

When the route is complete, the audio routing manager 212 might indicate to the media server 204 a "ready" signal, signifying that a route is available and ready for use. The media server 204 could then accept a software application's intent to play audio. However, the software applications need to understand that such acceptance is always temporary, and subject to various changes.

As stated, the system 200 always knows what's currently happening within the device 100, for example that user is in a telephone call, or that music is playing. Thus, the media server 204 by itself doesn't allow changing of routing for existing audio, but may request that the audio routing manager 212 mix in other audio with the current category, such as UI audio or some type of notification, with the audio that is currently playing. This is convenient because the media server 204 can make this request without checking with the audio routing manager to ensure that a route exists.

Another feature of the audio routing manager 212 is to play ring-tone out the main speaker 104, headphones 112, and the line out 120. A policy may exist in which it is desired to play through all speakers, due to desire to not miss a telephone call. This may be suitable in an instance where, for example, the headphones 112 are plugged into the device 100, but not on the user's ears. Thus, the audio routing module also has provision for a "broadcast route", that is, play through every possible speaker that is available.

Ports, Connections, Nodes and Routes

As explained above, when audio needs to be routed within device 100, a category for the audio is determined. The manner of routing the audio within device 100 is selected based, at least in part, on the category thus determined.

For each category, routing information is stored within a database that includes data tables $210_{1-n}$. In one embodiment, the routing information for a category is organized into one or more routes, and each route is organized into one or more connections. The following definitions apply herein:

a port is an audio beginning point (e.g. microphone) or an audio end point, (e.g. headphones);

a connection is a path from an audio beginning point to an audio end point (e.g. a path from an audio-in port to a speaker), and is a means by which two or more nodes are connected;

a node is any component involved a connection. The nodes in a typical connection include a start port, an end port, and zero or more intermediary components. Intermediary components may be, for example, audio processors such as those audio processors shown in FIG. 4; and a route is a group of one or more connections.

In one embodiment, the information about all categories, routes, connections, and nodes are stored in the data tables $210_{1-n}$. FIG. 5 shows an example relationship of routes, connections, and nodes, according to one embodiment. The arrangement of FIG. 5 is for example purposes only. Within FIG. 5, two audio categories are shown: ringtone and music. To simplify the example, each of the categories includes a single route. However, each category may have many routes. In one embodiment, the routes for a category are prioritized within the data tables $210_{1-n}$. These prioritized lists that belong to a category are collectively referred to as the priority-ranked list of the category. From FIG. 5, it is apparent that a single route can contain multiple connections, and that a single connection contains two or more nodes.

Audio Routing Infrastructure

FIG. 6 shows an example audio infrastructure 600. Although the data tables $210_{1-n}$ may contain various suggested routes for a specific category, these suggested routes remain in abstract (uncommitted) format until the port (node) manager 608 can verify that the various routes, connections and nodes are truly available.

Accordingly, the audio infrastructure 600 works as follows. The audio routing manager 212 receives notification that an audio event has occurred, and determines the category for the event. The audio routing manager reviews a prioritized list of routes associated with that category, where that list is held in the data tables $210_{1-n}$. As shown in FIG. 6, the routing manager sends an abstract route to the port manager. The port manager 608 then returns a concrete (verified) route to the audio routing manager 212. The audio routing manager 212 then passes the route to the routing handler 612, which implements the route.

For a given category, numerous audio routes can be contained within the data tables $210_{1-n}$. However, these routes are abstract (potentially workable but not hardware-verified) until the routes can be verified and affirmed by a combination of the port manager 608 and routing handler 612. Abstract routes contain identifiers describing generic node types, e.g. speaker, headphones, BlueTooth™ headset, etc., whereas concrete routes contain objects describing particular nodes, e.g. Acme BlueTooth headset Model XYZ.

Thus, just because a route is contained within the data tables $210_{1-n}$, that does not mean that at a given time that specific route is usable. The status of any particular route may change depending on usage of the device 100. The port manager 608 has the ability to determine whether a route is truly available (hardware-verified or concrete), and then pass that concrete route back to the audio routing manager 212. The audio routing manager 212 is free to look back to the data tables $210_{1-n}$ and need not rely solely on the port manager 608.

There are circumstances in which a route, connection, and/or node may appear to the audio routing manager 212 to be available, but in fact is not available. One example of this is might be a hardware failure. Accordingly, the audio routing manager 212 depends on the port manager 608 and routing handler 612 to verify that a route can in fact be implemented.

Where a route is found to be concrete, the port manager 608 instantiates an object that corresponds to the ports identified in the abstract routes. The routing manager 212 passes that concrete route to the routing handler 612. The routing handler 612 then makes calls to the objects that were instantiated by the port manager 608, and in doing so communicates directly with ports within the device 100 to see whether the proposed route connections are in fact achievable. If the answer is that the ports in the current route are achievable, the routing handler 612 establishes the specified route and mutes all other routes, and returns a "success" back to the routing manager 212. If the answer is 'no', the routing handler 612 could return "failure", which means the audio routing manager 212 will attempt to evaluate the next route in the priority-ranked list.

As stated, the audio routing manager 212 can be mistaken about whether a route is truly achievable. For example, the device 100 could get bumped or dropped somehow, a hardware error, or the user could make a sudden change. Rather than force the audio routing manager 212 to track all this ever-changing status of hardware within the device 100, this information is verified real-time on an as-needed basis by the port manager 608 and routing handler 612.

Thus, the actual availability of specific nodes within the device 100 is decoupled from the knowledge of the audio routing manager 212. This is because it is preferred that the routing manager 212 not be responsible for awareness of availability of specific nodes.

Acting on the route properties does not happen until the routing handler 612 determines that the route can be established. Once the route is established, the routing handler 612 then configures the route as indicated by the various properties. This can include, for example, setting up volume levels, volume curves, and mixing levels, among other things.

The port manager 608 may inform the routing manager that no concrete routes are available. All three of routing manager 212, port manager 608, and routing handler 612 are free to look at the database 210 and make use of the various properties contained therein.

Returning to FIG. 4, for a particular route, all connections are stored in the data tables $210_{1-n}$. After the above determination and verification of a concrete route, the various unwanted connections are muted, but the routes still exist. At a code level, storing and managing the status of all audio intermediaries would increase the amount of processing, and complicate the data tables $210_{1-n}$. Thus, its easier to mask the unwanted routes than to continually rebuild/reconstruct new routes every time an event occurs.

Example of Operation of Infrastructure

As stated earlier, the data tables $210_{1-n}$ holds lists of routes for specific categories, where these lists are ranked in order of priority. FIG. 7 shows two example audio categories, audio soundtrack of video, and voice telephone call. When an event of either of these categories occurs, the audio routing manager 212 cycles through the various routes associated with that event stored in the data tables $210_{1-n}$. Using the first example from FIG. 6, the audio routing manager 212 will select route 1, and pass that route 1 to the port manager 608 in an abstract format, as shown in FIG. 6. The audio routing manager 212 may be informed by either the port manager 608 or routing handler 612 that route 1 is not available. A route can be unavailable for a variety of reasons, one of which is that a connection or node within that route is occupied with some other task, or is failing. Supposing route 1 is unavailable, the audio routing manager 212 would then cycle to route 2, for example, and then re-inquire to the port manager 608 and the routing handler 612.

Properties

Various types of metadata associated with those routes, connection, and nodes is also held within the data tables $210_{1-n}$ as route properties, connection properties, and node properties, respectively. Properties can apply to an entire route, a connection, or a node. Changing the properties of a specific route can change the properties of all connections and nodes within that route, but only to the extent those connections and nodes participate in that route. Those same connections and nodes can have different properties for when they participate in a different route. Returning to FIG. 5, a speaker identifier is shown, having an automatic gain control (AGC) property. The property associated with the speaker identifier indicates that when that particular connection is used, a particular amount of automatic gain control should be applied to the speaker. FIG. 5 also shows numerous examples of ellipses signifying that connections and routes may also have properties.

A property is data that indicates something about an entity, where the entity is either a node, a connection or a route. Property data may indicate parameters for an audio effect, or information that affects whether the entity is mandatory, for example. The following is a list of example properties. A first property indicates per-connection mix leveling, which allows specification of fixed gain levels to be applied prior to the point at which multiple connections are mixed. One example of this property might be if a user is participating in a voice telephone call and is playing music while on that voice call. The per-connection mix level property can be used to attenuate the music but to leave the call volume unaltered.

Another property is per-node, per-connection, and per-route volume caps. One potential purpose for this property is the hearing-protection of a user, as well as volume balancing to keep volumes consistent across various output ports.

Another property is per-node, per-connection, and per-route volume curve specifications per connection mix levels. The system 200 can direct specific audio processors to drop the volume of a particular audio signal before that signal reaches any further nodes. If two connections are at different gains, one or the other needs to be leveled before the two connections are mixed, perhaps by the routing manager 212 although some other element may also achieve this. Next, volume sliders operable by a user can be linear, logarithmic, exponential, or some other scale. Such a feature is useful for tweaking volume curves at fine level of control which enables hardware compensation.

Another property is the ability to perform per-node, per-connection, and per-route digital signal processing (DSP) effects, such as equalization (EQ), dynamic range compression (DRC), automatic gain control (AGC). These effects can be applied selectively. This feature is valuable because the device 100 may use speakers with limited range or uneven frequency response. Ideally, the desired end result of audio playback is to achieve a flat, even frequency response in which sounds at all frequencies are properly conveyed. DSP effects can address this. It is also important to note that these effects can be applied to a node, a connection, or an entire route.

Another property is per-connection optionality for broadcast routes. This feature includes noticing that a specific connection may have been overlooked when building a route. As noted earlier, the routing manager 212 passes abstract routes to the port manager 608, which determines whether various nodes are properly connected. If a route is designated as optional within the data tables $210_{1-n}$, and part of that route is not present or available, that route is muted, and never becomes concrete. If a route property is optional, when the audio routing manager 212 cycles through the various routes, it checks the condition upon which the designation of optional is based. If the condition fails, the audio routing manager 212 de-activates the route and does not further consider it. For example, the system 200 may want to broadcast a ringtone to several places. Now also suppose that the system 200 wishes to broadcast only high quality ringtones. In such a case, the system 200 would only consider those ports that provide high sample rates, so that connection for those ports could be considered optional under the condition that it supports a minimum sample rate.

Another property is per-port, per-connection, and per-route hints about what to do when encountering specifically identified audio processors. For example, if an audio processor has a weak dynamic range (e.g. −10 db to 0 db), a route incorporating that audio processor might contain a "hint" disqualifying that audio processor from being used in a certain route where outstanding dynamic range is required. Such hints are stored in the database $210_{1-n}$. A hint is a type of property used to help make a routing decision in the face of ambiguity. For example, if there are two BlueTooth headsets available, the system 200 might want to choose the one that has a larger dynamic range, so the hint would be "large dynamic range preferred". These hints can be evaluated for example by the port manager 608.

Another property is an index of an audio processor's properties within the data tables $210_{1-n}$ to determine its behavior within code, or within scripting languages. One way to achieve this is by using a identifier in the form of a character string, which is used to specifically identify an audio processor. This feature is not exposed to users. It is sometimes possible to identify a particular port and can distinguish it from other ports of the same type. For example, there might be 3 BlueTooth headsets paired with a phone that each provides a unique identifier (UID). The data tables $210_{1-n}$ can store information that is specific to a particular port via UID, and use that to drive policy decisions. One example might be to keep track of how reliable a particular port is. If a particular BlueTooth headset is known to frequently drop calls, that headset can be marked as "bad" within the data tables $210_{1-n}$, and cause the system 200 to present a dialog to the user that there might be a problem with that particular headset.

Another property is the ability to enable the data tables $210_{1-n}$ to accept some input directly from users under specific circumstances. A user may have odd or unusual preferences counter-intuitive to or not anticipated by the designers of the system 200.

Another property is per-connection and per-route echo cancellation/noise reduction settings. This means for example that echo cancellation and noise reduction, or other parameter sets apply to any of node, connection, or route. It also means the audio routing manager 212 can say "if you can't do this, disallow the route".

Another property is per-port, per-connection, and per-route preconditions and postconditions, such as minimum dynamic range, or necessity of volume control. One example might be a port at which a minimum dynamic range is needed. If the specified minimum dynamic range can't be reached, the audio routing manager 212 will "fail" the route or compensate somehow, perhaps by forcing other audio processors to adjust. An example of this might be to ensure that the nodes and connections sufficiently satisfy a given set of criteria (conditions). The conditions might be that various nodes allow for volume control over at least some minimum range. If the nodes within a given route do not allow this, the route fails.

Another property is per-category prevention of screen dimming or auto lock, an example of which might be video or game categories. A specific video-related route could have a property that prevents screen-dimming or auto-locking All of the above properties have in common that they provide an advantage if the device 100 is built in multiple versions, including using audio processors of varying capabilities. In such a case it is easier to change the data tables $210_{1-n}$ than to change installed code.

Aliasing

The system 200 also accommodates per-category aliasing of route lists. Recall that route-lists are priority-ranked list of routes stored in data tables $210_{1-n}$. If a route-list is already known and established, in other words all of the work and effort of setting up a route-list has already been done, that route-list can be named and have an alias. Using the name of an existing route-list avoids the need to duplicate data, because each route list may have a lot of properties associated therewith. Data duplication is desired to be avoided. Referencing an alias could avoid data-duplication. Also, if it is necessary to change some properties of a single route-list, all routes with that alias are also changed. It is not necessary to repeat performing the changes. Aliasing can be per-category, per-port, per-connection, per-node, per route, and thus possibly per-anything.

Fall Back

Another property is the ability to enable per-category route list fallback logic, which is used if a specific category somehow fails unexpectedly, then fall back to some other category. One example might be where an event is in the "music" category, cycle all available routes in the route list for that category, as suggested by FIG. 6. If all routes in a specific category fail, then none of the routes for that category develop even into abstract format. The system 200 will note that something is clearly wrong within the device 100, but will still attempt to recover, potentially by going back to a different category such as "audio soundtrack". The system 200 would then cycle through those routes.

Hardware Implementation

Figure 8:
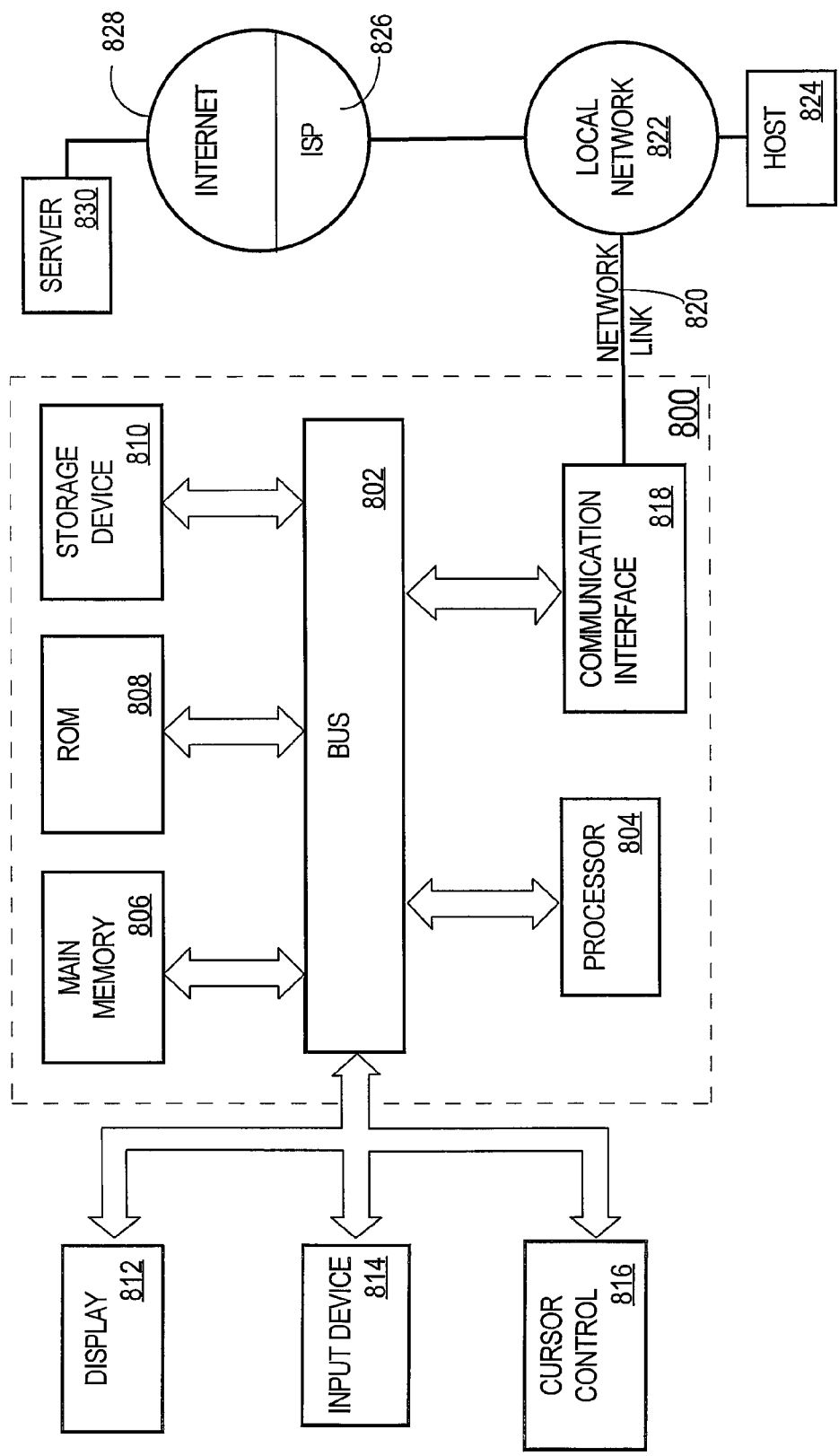
FIG. 8 is a block diagram of a computer system according to an embodiment of the invention.

The approaches described herein may be implemented on any type of computing platform or architecture. FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 800, various computer-readable media are involved, for example, in providing instructions to processor 804 for execution. Such a medium may take many forms, including but not limited to, non-volatile media, and volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, a modem, or some type of wireless connection such as but not limited to WiFi, to provide a data communication connection to a corresponding type of telephone line. As another example, communication interface 818 may be a local area network (LAN) card to provide a data communication connection to a compatible LAN. In any such implementation, communication interface 818 sends and receives electrical, electromagnetic or optical signals that carry digital data streams representing various types of information. The computer system 800 may also comprise a desktop environment, audio/video gear such as a receiver or surround sound audio/video processor, a digital media receiver such as but not limited to an Apple TV, an audio card, or a pro-audio console and software.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave. The computer system 800 may be a handheld device, may be powered by a battery, and may have a touchscreen.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for routing audio in a device, comprising:
   detecting, within the device, an event that indicates a need to route audio within the device;
   based on the event, selecting a particular set of routing information to read;
   reading the particular set of routing information;
   wherein the particular set of routing information includes route data for each route of one or more routes;
   wherein the route data for each of the one or more routes includes connection data for each connection of one or more connections;
   wherein the connection data for each connection of the one or more connections includes node data that identifies two or more nodes involved in said each connection;
   wherein the two or more nodes that are identified in the node data for each connection correspond to device components through which audio is routed when said each connection is used to route audio;
   wherein the particular set of routing information includes property information specified for at least one of:
      a particular route identified in the routing information;
      a particular connection that belongs to the particular route; or
      a particular node identified in the particular connection, wherein the particular node corresponds to a component of the device that is involved in routing audio when the particular connection is used to route audio in the device;
   based on the property information, performing at least one of:
      determining whether to use the particular route to route audio in response to the event; or
      determining an effect to apply to the audio that is routed in response to the event.

2. The method of claim 1 wherein:
the property information specifies a property for said particular connection; and
the property information indicates whether use of the particular connection is optional or mandatory when the particular route is used to route audio.

3. The method of claim 1 wherein:
the property information specifies performing per-connection mix leveling.

4. The method of claim 1 wherein:
the property information specifies a volume cap for at least one of said particular route, said particular connection, or said particular node.

5. The method of claim 3 wherein:
the property information specifies volume curve specifications for at least one of said particular route, said particular connection, or said particular node.

6. The method of claim 1 wherein:
the property information specifies a digital signal processing (DSP) effect for at least one of said particular route, said particular connection, or said particular node.

7. The method of claim 6 wherein the DSP effect is equalization (EQ).

8. The method of claim 6 wherein the DSP effect is dynamic range compression (DRC).

9. The method of claim 6 wherein the DSP effect is automatic gain control (AGC).

10. The method of claim 1 wherein:
the property information specifies per-connection optionality for broadcast routes.

11. The method of claim 1 wherein:
the property information specifies hints about what to do when encountering specifically identified audio processors for at least one of said particular route, said particular connection, or said particular node.

12. The method of claim 1 further comprising indexing an audio processor's properties within one or more data tables to determine the audio processor's behavior within code.

13. The method of claim 1 further comprising accepting input directly from a user, and modifying the property information based on the input.

14. The method of claim 1 wherein:
the property information specifies echo cancellation or noise reduction settings for at least one of said particular route or said particular connection.

15. The method of claim 1 wherein:
the property information specifies a precondition or a post-condition for at least one of said particular route, said particular connection, or said particular node.

16. The method of claim 1 wherein:
the property information specifies per-category prevention of screen dimming or auto lock.

17. The method of claim 1, further comprising:
enabling per-category aliasing of route lists.

18. The method of claim 1 further comprising:
enabling per-category route list fallback logic.

19. The method of claim 1 wherein the device is a surround sound audio/video processor.

20. The method of claim 1 wherein the device is a digital media receiver.

21. The method of claim 1 wherein the device is an audio card.

22. The method of claim 1 wherein the device is a pro-audio console.

23. A device, comprising:
one or more data tables that contain routing information, wherein the routing information includes route data for each of a plurality of routes;
wherein the route data for each of the plurality of routes includes connection data for each connection of one or more connections;
wherein the connection data for each connection of the one or more connections includes node data that identifies two or more nodes involved in said each connection;
wherein the one or more data tables further include property information for at least one of:
a particular route identified in the routing information;
a particular connection that belongs to the particular route; or
a particular node identified in the particular connection, wherein the particular node corresponds to a component of the device that is involved in routing audio when the particular connection is used to route audio in the device;
an audio routing system that is configured to route audio within the device based on the routing information;
wherein the audio routing system is configured to read the property information and, based on the property information, performing at least one of:
determining whether to use the particular route to route audio in response to an event; or
determining an effect to apply to the audio that is routed in response to the event.

24. One or more non-transitory computer-readable media storing instructions which, when executed by one or more processors, cause:
detecting, within the device, an event that indicates a need to route audio within the device;
based on the event, selecting a particular set of routing information to read;
reading the particular set of routing information;
wherein the particular set of routing information includes route data for each route of one or more routes;
wherein the route data for each of the one or more routes includes connection data for each connection of one or more connections;
wherein the connection data for each connection of the one or more connections includes node data that identifies two or more nodes involved in said each connection;
wherein the two or more nodes that are identified in the node data for each connection correspond to device components through which audio is routed when said each connection is used to route audio;
wherein the particular set of routing information includes property information specified for at least one of:
a particular route identified in the routing information;
a particular connection that belongs to the particular route; or
a particular node identified in the particular connection, wherein the particular node corresponds to a component of the device that is involved in routing audio when the particular connection is used to route audio in the device;
based on the property information, performing at least one of:
determining whether to use the particular route to route audio in response to the event; or
determining an effect to apply to the audio that is routed in response to the event.

25. The one or more non-transitory computer-readable media of claim 24, wherein:
the property information specifies a property for said particular connection; and
the property information indicates whether use of the particular connection is optional or mandatory when the particular route is used to route audio.

26. The one or more non-transitory computer-readable media of claim 24, wherein:
the property information specifies performing per-connection mix leveling.

27. The one or more non-transitory computer-readable media of claim 24, wherein:
the property information specifies a volume cap for at least one said particular route, said particular connection, or said particular node.

28. The one or more non-transitory computer-readable media of claim 26, wherein:
the property information specifies volume curve specifications for at least one said particular route, said particular connection, or said particular node.

29. The one or more non-transitory computer-readable media of claim 24, wherein:
the property information specifies a digital signal processing (DSP) effect for at least one said particular route, said particular connection, or said particular node.

30. The one or more non-transitory computer-readable media of claim 29, wherein the DSP effect is equalization (EQ).

31. The one or more non-transitory computer-readable media of claim 29, wherein the DSP effect is dynamic range compression (DRC).

32. The one or more non-transitory computer-readable media of claim 29, wherein the DSP effect is automatic gain control (AGC).

33. The one or more non-transitory computer-readable media of claim 24, wherein:
the property information specifies per-connection optionality for broadcast routes.

34. The one or more non-transitory computer-readable media of claim 24, wherein:
the property information specifies hints about what to do when encountering specifically identified audio processors for at least one said particular route, said particular connection, or said particular node.

35. The one or more non-transitory computer-readable media of claim 24, wherein the instructions include instructions which, when executed by the one or more processors, further cause indexing an audio processor's properties within one or more data tables to determine the audio processor's behavior within code.

36. The one or more non-transitory computer-readable media of claim 24, wherein the instructions include instructions which, when executed by the one or more processors, further cause accepting input directly from a user, and modifying the property information based on the input.

37. The one or more non-transitory computer-readable media of claim 24, wherein:
the property information specifies echo cancellation or noise reduction settings for at least one said particular route or said particular connection.

38. The one or more non-transitory computer-readable storage media of claim 24, wherein:
the property information specifies a precondition or a postcondition for at least one said particular route, said particular connection, or said particular node.

39. The one or more non-transitory computer-readable media of claim 24, wherein:
the property information specifies per-category prevention of screen dimming or auto lock.

40. The one or more non-transitory computer-readable media of claim 24, wherein the instructions include instructions which, when executed by the one or more processors, further cause:
enabling per-category aliasing of route lists.

41. The one or more non-transitory computer-readable media of claim 24, wherein the instructions include instructions which, when executed by the one or more processors, further cause:
enabling per-category route list fallback logic.

42. The one or more non-transitory computer-readable media of claim 24, wherein the device is a surround sound audio/video processor.

43. The one or more non-transitory computer-readable media of claim 24, wherein the device is a digital media receiver.

44. The one or more non-transitory computer-readable media of claim 24, wherein the device is an audio card.

45. The one or more non-transitory computer-readable media of claim 24, wherein the device is a pro-audio console.

* * * * *